(12) United States Patent
Evans

(10) Patent No.: US 9,442,304 B2
(45) Date of Patent: Sep. 13, 2016

(54) INSULATING ARTICLE FOR OPTICAL DEVICES

(71) Applicant: Fluke Corporation, Everett, WA (US)

(72) Inventor: Tyler B. Evans, Edmonds, WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 14/137,067

(22) Filed: Dec. 20, 2013

(65) Prior Publication Data

US 2015/0177532 A1    Jun. 25, 2015

(51) Int. Cl.
| | | |
|---|---|---|
| *G01J 3/46* | (2006.01) | |
| *G02B 27/58* | (2006.01) | |
| *B65D 85/38* | (2006.01) | |
| *A41D 13/08* | (2006.01) | |
| *A45C 11/38* | (2006.01) | |
| *G03B 17/08* | (2006.01) | |
| *G01J 3/50* | (2006.01) | |
| *G02B 7/00* | (2006.01) | |

(52) U.S. Cl.
CPC .............. *G02B 27/58* (2013.01); *A41D 13/081* (2013.01); *A45C 11/38* (2013.01); *B65D 85/38* (2013.01); *G01J 3/50* (2013.01); *G02B 7/00* (2013.01); *G03B 17/08* (2013.01); *A45C 2200/10* (2013.01)

(58) Field of Classification Search
CPC .. H04N 5/2252; A41D 19/01; A41D 13/081; B65D 85/38
See application file for complete search history.

(56) References Cited

U.S. PATENT DOCUMENTS

| | | | |
|---|---|---|---|
| 4,176,701 A | | 12/1979 | Welgan |
| 4,383,565 A | * | 5/1983 | Denmat ..................... 206/316.1 |
| 4,727,675 A | | 3/1988 | Huntt |
| 4,982,841 A | * | 1/1991 | Goedecke ................ 206/316.2 |
| 5,087,934 A | * | 2/1992 | Johnson ................. G03B 17/08 396/27 |
| 5,173,585 A | | 12/1992 | Dokken |
| 5,337,891 A | | 8/1994 | Toth |

(Continued)

FOREIGN PATENT DOCUMENTS

DE        2226721 A1    12/1973

OTHER PUBLICATIONS

Lane, Hill .https://www.youtube.com/watch?v=WxUl6aHwWyo, Aug. 1, 2011.*

(Continued)

*Primary Examiner* — Kara E Geisel
*Assistant Examiner* — Maurice Smith
(74) *Attorney, Agent, or Firm* — Fredrikson & Byron, P.A.

(57) ABSTRACT

This disclosure provides systems and methods for using an article in connection with an optical device. Some systems may include an article configured to receive the optical device into a main body of the article. The main body may also include an access opening configured to receive a hand of the user to allow the user to operate the optical device while the device is received within the main body. The main body may include an optical aperture to allow the optical device to capture one or more spectrums of light from within the main body. The main body may also include a viewing aperture to allow a user to view a display of the optical device from outside of the main body. Some systems include an alignment apparatus configured to maintain an orientation of the optical device within the main body such that the optical device remains in alignment with both the optical and viewing apertures. Some systems include a viewing visor configured to facilitate the viewing of the display of the optical device from outside of the main body through the viewing aperture.

30 Claims, 7 Drawing Sheets

(56) References Cited

U.S. PATENT DOCUMENTS

| | | | |
|---|---|---|---|
| 5,375,263 A | 12/1994 | Cuccia | |
| 5,456,277 A * | 10/1995 | Pontius, Jr. | 135/90 |
| 5,625,854 A * | 4/1997 | White | 396/429 |
| 5,699,632 A | 12/1997 | Stout et al. | |
| 5,748,089 A * | 5/1998 | Sizemore | G08B 21/0297 340/568.7 |
| 6,056,130 A * | 5/2000 | Ovadia | 211/85.2 |
| 6,154,882 A * | 12/2000 | Ullman | 2/20 |
| 6,178,554 B1 * | 1/2001 | Pake et al. | 2/20 |
| D477,581 S * | 7/2003 | Iijima et al. | D14/138 AB |
| 7,105,796 B2 | 9/2006 | Lewis et al. | |
| 8,260,128 B1 | 9/2012 | Sturm et al. | |
| 8,342,758 B2 | 1/2013 | Braithwaite | |
| 8,615,814 B1 * | 12/2013 | Hawkins | 2/66 |
| 2004/0094452 A1 * | 5/2004 | Scott et al. | 206/769 |
| 2006/0010588 A1 * | 1/2006 | Schuster | A45C 7/0081 2/455 |
| 2006/0289768 A1 * | 12/2006 | Vallese | G01J 5/02 250/353 |
| 2007/0193901 A1 * | 8/2007 | Cohen | 206/316.2 |
| 2009/0255845 A1 * | 10/2009 | Beitman | G03B 17/56 206/578 |
| 2010/0287677 A1 * | 11/2010 | Alexander | 2/50 |
| 2010/0299800 A1 * | 12/2010 | Jackson, Jr. | 2/69 |
| 2012/0072167 A1 * | 3/2012 | Cretella, Jr. | G06F 1/1626 702/150 |

OTHER PUBLICATIONS

European Extended Search Report for Application No. 14199207.3, 6 pages, Apr. 2, 2015.

* cited by examiner

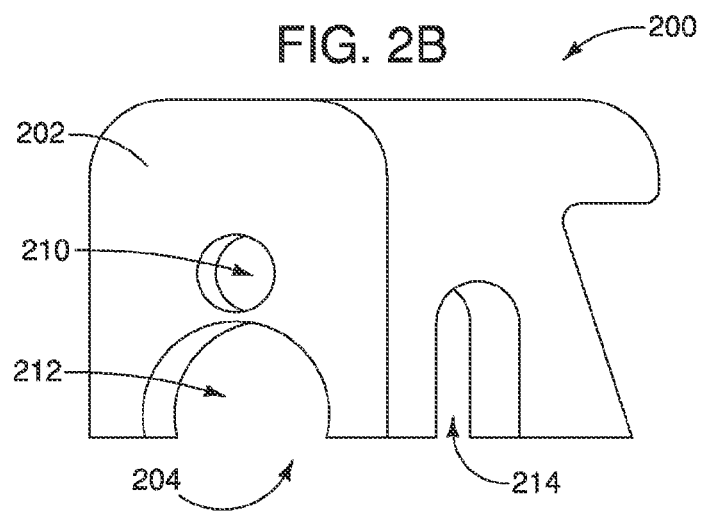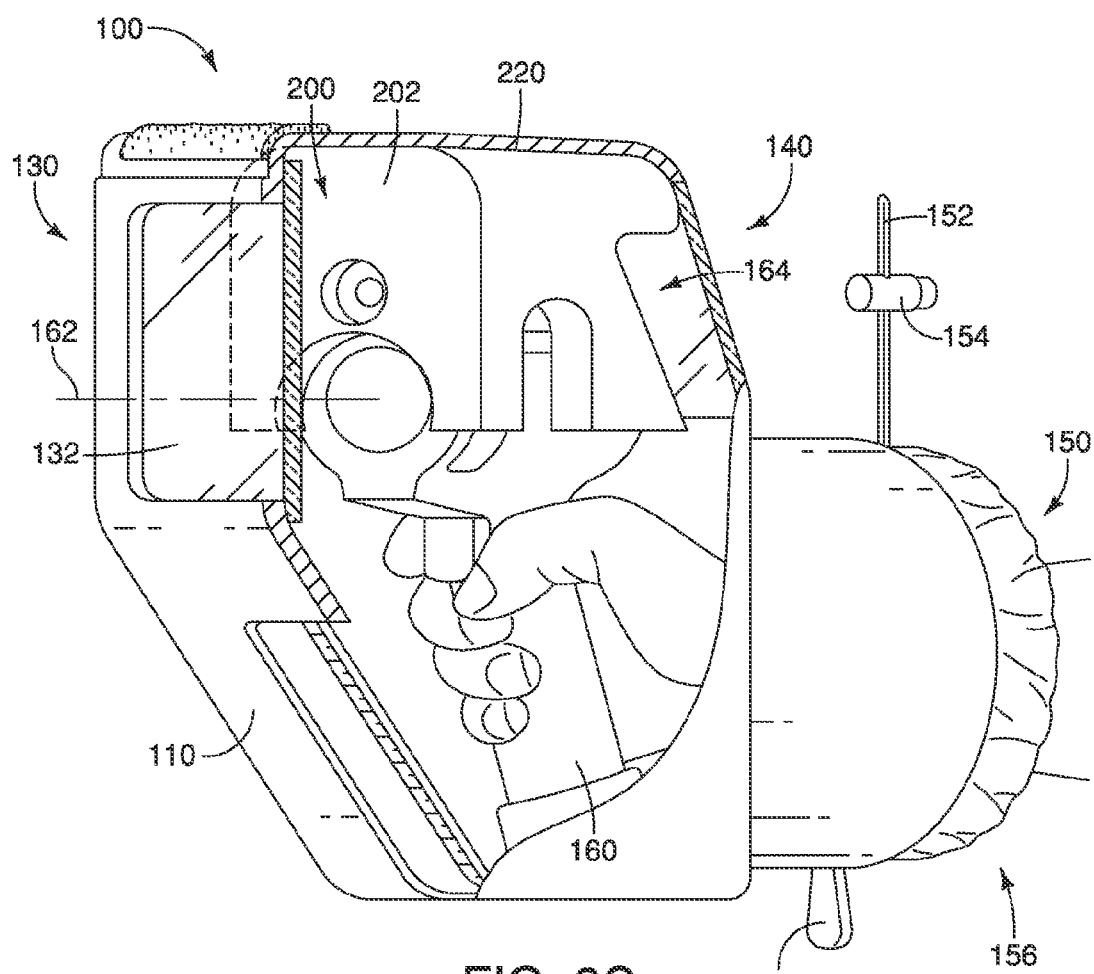

INSULATING ARTICLE FOR OPTICAL DEVICES

BACKGROUND

Optical devices are used in a variety of situations across different industries. One type of optical device is a thermal imaging camera which may often be used during maintenance inspections to thermally inspect equipment. Example equipment may include rotating machinery, electrical panels, or rows of circuit breakers, among other types of equipment. Thermal imaging cameras can detect equipment hot spots, such as overheating machinery or electrical components, to help identify potentially problematic technical problems and ensure timely repair or replacement of the overheating equipment.

Optical devices are also utilized in a variety of different environments. For example, thermal imaging cameras may be used to monitor equipment deployed in both hot and cold environments. In such situations, the accuracy of images generated and/or temperatures sensed by a thermal imaging camera may be affected by the ambient temperature of an environment where the temperature is extreme and/or outside of a temperature range of operation of the camera.

SUMMARY

This disclosure generally relates to systems and methods for using an article in connection with an optical device. In certain examples, an article may include a main body configured to receive the optical device into an interior of the main body. The main body may also include features to allow a user to operate the optical device while the device is substantially covered by the main body. In some examples, the main body may include an access opening configured to receive a hand of the user into an interior of the main body. The main body may also include an optical aperture to allow the optical device to capture one or more spectrums of light from within the main body. In some examples, the main body may include a viewing aperture to allow the user to view a display of the optical device while the device is substantially covered by the main body. Some systems also include an alignment apparatus configured to maintain an orientation of the optical device within the main body. According to some examples, a viewing visor may be provided to facilitate the viewing of the display in bright environments.

Examples disclosed may provide one or more advantages over existing systems and methods. For example, systems and methods provided allow a user to operate an optical device while the device is substantially enclosed within the article. This provides the advantage of improved performance as the optical device is insulated and protected from environmental elements that may interfere with the normal operation of the device. As just one example, extreme temperatures may cause an optical device to generate inaccurate images and/or imaging data. In addition to improved performance, systems and methods disclosed may also provide the advantage of increased longevity of the optical device as well as decreased cost of repairs to the optical device associated with using the device in extreme environments. Systems and methods also provide the advantage of insulating and protecting one or more members of the user that are received into a main body of the article.

BRIEF DESCRIPTION OF THE DRAWINGS

The following drawings are illustrative of particular embodiments of the invention and do not limit the scope of the invention. The drawings are not necessarily to scale, unless so stated. Any dimensions indicated on the drawings are approximate and may only be applicable for the embodiment depicted. The drawings are intended for use in conjunction with the explanations in the following detailed description. Embodiments of the invention will hereinafter be described in conjunction with the appended drawings, wherein like numerals denote like elements.

FIG. 2B is a perspective view of an alignment apparatus for use with the article of FIG. 1.

FIG. 2C is a perspective view of the alignment apparatus device of FIG. 2B together with the article of FIG. 1.

DETAILED DESCRIPTION

The following detailed description is exemplary in nature and is not intended to limit the scope, applicability, or configuration of the invention in any way. Rather, the following description provides some practical illustrations for implementing embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Optical devices may be operable by a user to generate images and/or imaging data. According to some examples, an optical device may comprise one or more optical sensors and one or more displays. Each optical sensor may be configured to capture one or more spectrums of light along an optical axis and each display may be configured to display images and/or imaging data generated by the optical device. In some examples, the display may comprise a touch screen configured to receive touch inputs from a user. Examples of optical devices include, but are not limited to, cameras and video cameras.

According to some examples, an optical device may comprise a thermal imaging camera. Thermal imaging cameras may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor. The thermal imaging camera may also include one or more displays to display generated images to a user. In some examples, the thermal imaging camera may also display imaging data (e.g., temperature of a scene) to a user via the display.

Certain embodiments of the invention are directed to an article for use with an optical device. While numerous examples are provided where an optical device comprises a thermal imaging camera, such examples are not intended to limit the scope of the invention. One skilled in the art will appreciate that systems, methods, and features provided in this application in examples relating to thermal imaging cameras may also be applied to other types of optical devices and are within the scope of this application.

Figure 1:
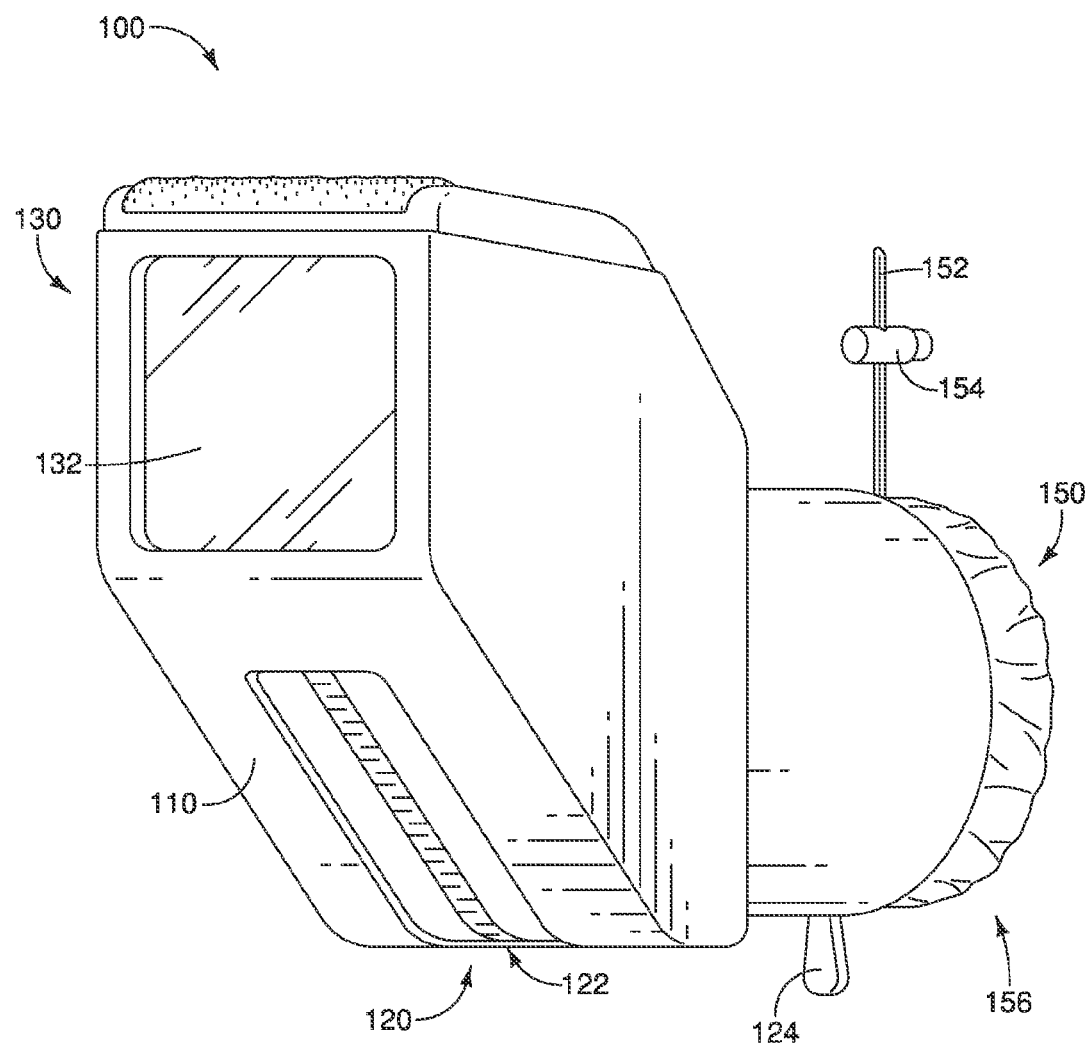
FIG. 1 is a perspective view of an article for use with an optical device.

FIG. 1 is a perspective view of an article 100 for use with an optical device. According to certain examples, article 100 may comprise a muff, mitt, glove, or any other article suitable for a particular application or preference of a user. Article 100 may comprise a main body 110 configured to receive and substantially enclose an optical device and one or more members of a user. Different examples of main body 110 may vary in size and shape as necessary to accommodate the size and shape of a particular optical device to be used in connection with main body 110 as well as the size and shape of the one or more members of the user. In some examples, main body 110 may be configured to receive and substantially enclose a thermal imaging camera and a hand of an operator.

Main body 110 may be configured to insulate an interior of main body 110 from ambient surroundings of main body 110 to control the temperature of the interior and/or protect the optical device, as well as the one or more members of the operator, from environmental elements external to main body 110. Environmental elements may include, but is not limited to, temperature extremes (e.g., extremely low or high temperatures, rapid temperature changes), liquids and solids (e.g., forms of precipitation, chemicals, condensation, dust, debris, smoke, soot), hot hazards (e.g., sparks, open flames, steam, heat waves), and electrical hazards (e.g., static electricity, unintentional grounding). Insulating and protecting the optical device provides the advantage of allowing an optical device to be used in harsh environments otherwise unsuitable or unfavorable for operation of the optical device. Accordingly, main body 110 may comprise one or more layers made from any material as necessary to insulate and protect the optical device received within the interior of main body 110 from one or more environmental elements external to main body 110. For example, main body 110 may be configured to be used in connection with a thermal imaging camera. Many thermal imaging cameras include temperature sensing elements, the performance of which may be adversely affected by extreme temperatures or by sudden changes in temperature. For example, a camera's ability to function may be limited by extreme ambient temperatures as one or more parts (e.g., batteries, LCD screens) of the camera may only be rated to operate within a certain ambient temperature rating. In such examples, main body 110 may comprise one or more layers of insulating material to isolate the thermal imaging camera from the extreme-cold temperatures. Such features provide advantages of allowing the camera to be operated within the ambient temperature rating of its parts, preventing degradation of image quality and accuracy associated with operating the camera in extreme temperatures, and increasing the longevity of the camera by reducing stress effects caused by rapid thermal expansion and contraction of the camera's parts as a result of extreme temperature changes.

According to some examples, a temperature of an interior of main body 110 may be controlled by heating and/or cooling element located within the interior of main body 110. Such heating and/or cooling elements may be electrical or chemical in nature. In some examples, temperature control may be affected by leveraging radiant heat given off during normal operation of optical device 160 by trapping the radiant heat within main body 110.

Main body 110 may include main body opening 120 configured to receive an optical device into an interior of main body 110. Main body opening 120 may be configured to opened and closed via a fastening apparatus 122. Fastening apparatus 122 may comprise one or more fastening mechanisms 124 including, but not limited to, zippers, buttons, snaps, clips, and hook-and-loop. In the example illustrated in FIG. 1, main body opening 120 is located along an underside of main body 110 and includes a zipper configured to open and close the main body opening 120. One skilled in the art will appreciate that in other examples, main body opening 120 may be located in any suitable location on main body 110. Further, main body opening 120 may be of any size or shape to accommodate the dimensions of one or more optical devices to be used in connection with article 100.

According to some examples, main body 110 may include one or more features to enable an operator to use the optical device while the optical device is substantially enclosed within main body 110. For example, main body 110 may comprise an optical aperture 130, a viewing aperture 140, and an access opening 150.

Figure 2A:
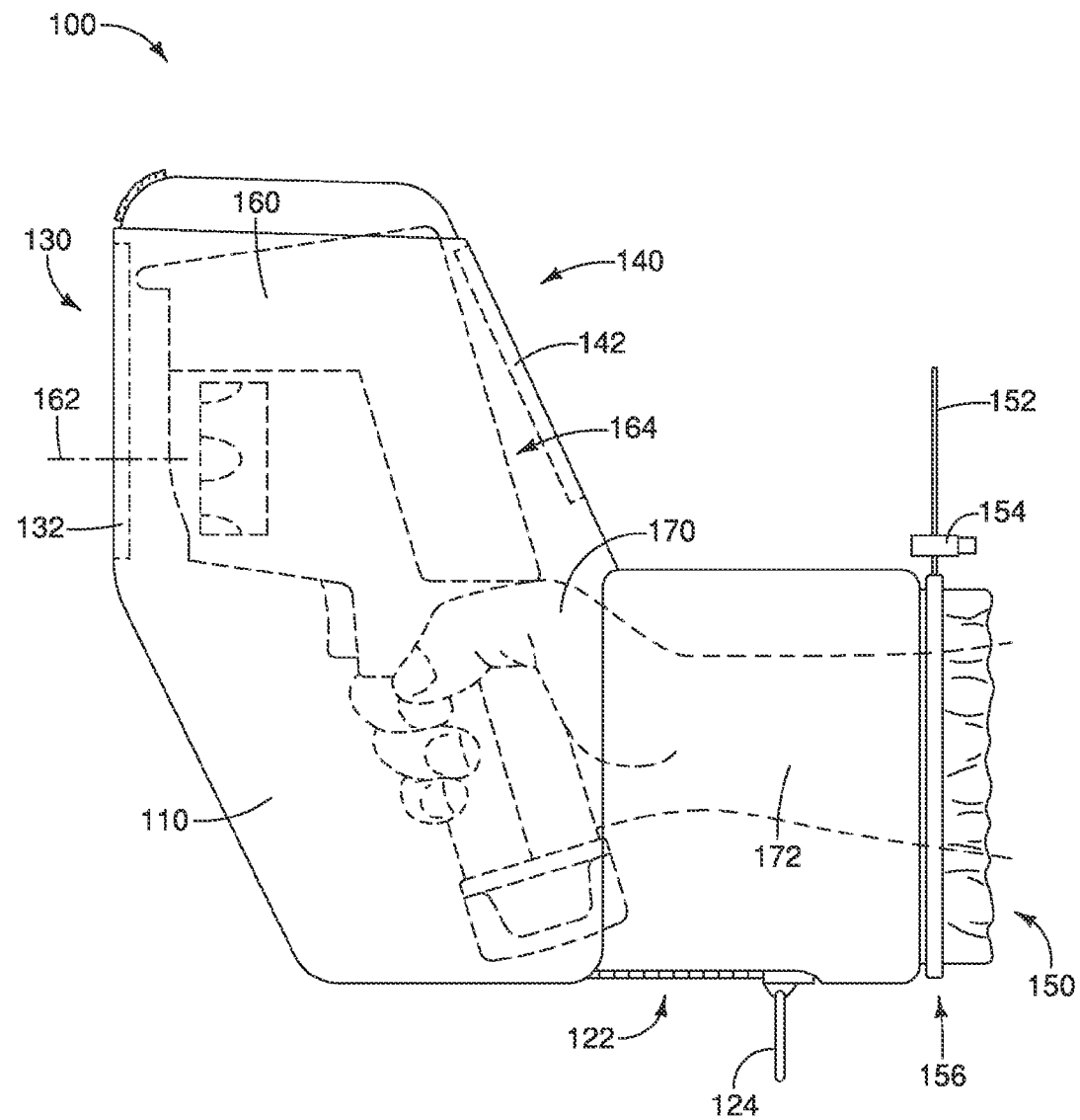
FIG. 2A is a side plan view of the article of FIG. 1 including an optical device shown in phantom contained within a main body of the article.

Optical aperture 130 may be configured to allow one or more spectrums of light into and/or out of the main body 110. Optical aperture 130 may be positioned on main body 110 in any suitable location based on a particular optical device article 100 is configured to be used in connection with. Similarly, the size and shape of optical aperture 130 may also depend on the optical device. For example, FIG. 2A is a side plan view of article 100 of FIG. 1 including an optical device 160 within main body 110. Optical device 160 may include an optical sensor configured to capture a spectrum of light along an optical axis 162. In this example, optical aperture 130 may be configured to be in alignment with optical axis 162 thus allowing optical device 160 to capture one or more spectrums of light from inside of main body 110. Examples where optical aperture 130 is configured to allow one or more spectrums of light out of main body 110 may be particularly advantageous for optical devices that include integrated torches, flashlights, lasers, or other light generating parts.

In some examples, main body 110 may also include a window 132 configured to substantially cover optical aperture 130. Window 132 provides the advantage of facilitating the insulation and protection of optical device 160 from environmental elements outside of main body 110. In some examples, window 132 may be configured to be substantially transparent to one or more spectrums of light depending on a particular optical device article 100 is configured to be used in connection with. For example, where the optical device comprises a visible light camera, window 132 may be configured to be substantially transparent to visible light. Similarly, where the optical device comprises a thermal imaging camera, window 132 may be configured to be substantially transparent to both the infrared and the visible light spectrum. According to some examples, window 132 may be covered by a filter to allow only a particular spectrum of light, or range of wavelengths of light, to pass through window 132. In some examples, the internal and/or the external surface of window 132 may be treated to inhibit the formation of condensation that may occur due to a temperature differential between the interior and exterior of main body 110.

According to some examples, main body 110 may be configured to receive one or more members of a user into an interior of main body 110 via an access opening 150. Access opening 150 may allow a hand 170 and a forearm 172 of a user to be received into an interior of main body 110. In some examples, access opening 150 may be configured to allow two hands into the interior of main body 110 where two hands are necessary to operate optical device 160. Access opening 150 may also be configured to receive optical device 160 into main body 110. In such examples, access opening 150 may be used in lieu of main body opening 120. Accordingly, access opening 150 may be of any suitable size or shape based on the optical device article 100 is to be used in connection with.

In some examples, main body 110 may also include a closure apparatus 156 configured to be selectively operable to open or close access opening 150. In some examples, closure apparatus 156 may comprise one or more elastic members 152 and fastening mechanisms 154 to form a seal around the hand or a forearm of the user when access opening 150 is closed. One skilled in the art will appreciate that closure apparatus 156 may comprise any combination of fasteners or materials to effectively open and close access opening 150. These features allow a user to operate optical device 160 from within main body 110. It also provides the additional advantage of insulating and protecting the one or more members of the user from environmental elements external to main body 110. For example, in extreme-cold environments, a user's hand 170 and forearm 172 may be kept warm within main body 110 and the sealable access opening 150 may be closed to keep cold air from entering main body 110.

Main body 110 may include viewing aperture 140 configured to allow a user to view an interior of main body 110 from outside main body 110. Viewing aperture 140 is particularly advantageous where an optical device 160 includes a display 164. In such examples, viewing aperture 140 allows a user to view display 164 from outside of main body 110 without having to remove optical device 160 from article 100. Main body 110 may also include a window 142 configured to substantially cover viewing aperture 140. Window 142 provides the advantage of facilitating the insulation and protection of optical device 160 from environmental elements outside of main body 110. In some examples, the size and shape of window 142 may be configured to correspond with the size and shape of display 164.

As noted above, display 164 of optical device 160 may be configured to receive touch inputs from a user. In such examples, window 142 may be configured to allow a user to interface with display 164 from outside of main body 110. According to some examples, the internal and/or the external surface of window 142 may be treated to inhibit the formation of condensation that may occur due to a temperature differential between the interior and exterior of main body 110. Window 142 may be made from any material to facilitate user interaction with display 164 which may comprise, for example, capacitive or resistive touch screens. Window 142 may be positioned on main body 110 in such a way that when optical device 160 is received within main body 110, display 164 is flush with and/or adjacent to window 142. Similarly, the orientation and/or angle of window 142 may be configured to correspond with the orientation and/or angle of display 164. For example, window 142 may be configured to be substantially parallel with display 164 to provide the advantages of aligning the respective viewing angles of window 142 and display 164 and to reduce glare that may impede the user's ability to view display 164 through window 142.

In some examples, main body 110 further comprises an alignment apparatus configured to maintain an orientation of optical device 160 within main body 110. FIG. 2B is a perspective view of an alignment apparatus 200 configured to be used together with an article and an optical device. FIG. 2C is a perspective view of alignment apparatus 200 together with article 100 of FIG. 1. In this example, alignment apparatus 200 may be configured to fix optical device 160 relative to main body 110 in an orientation where optical aperture 130 is in alignment with optical axis 162 and viewing aperture 140 is in alignment with display 164. In some examples, alignment apparatus 200 may comprise one or more apertures 210 and/or one or more cutaways 212 as to not obstruct optical axis 162 and/or display 164. One or more cutaways 214 may also be used to provide a user access to optical device 160. Alignment apparatus 200 may be fixed to, or integral with, an interior surface of main body 110. In some examples, alignment apparatus 200 prevents optical device 160 from rotating or shifting within main body 110 thereby providing the advantage of allowing a user to freely operate optical device 160 without the need for realigning optical device 160 within main body 110. For example, alignment apparatus 200 may be configured to engage with optical device 160 to maintain a desirable orientation of optical device 160 within main body 110. In some examples, alignment apparatus 200 may comprise a foam or plastic alignment structure 202 fixed to an interior surface of main body 110. Alignment structure 202 may include a surface 204 configured to correspond with a surface or structure on optical device 160 that allows alignment structure 202 to engage with optical device 160 to maintain a desired orientation. In some examples, surface 204 of alignment structure 202 may be molded to the shape of a surface of optical device 160 and engaging optical device 160 and alignment structure 202 comprises fitting surface 204 of alignment structure 202 together with optical device 160. In some examples, the size, shape and material of alignment structure 202 may be configured to form a friction fit with optical device 160 when the two are engaged. According to some examples, physical attributes of article 100 may be used to perpetuate engagement between alignment structure 202 and optical device 160 during normal operation. For example, alignment structure 202 may be fixed to an upper interior surface 220 of main body 110 and be configured to engage with a top surface of optical device 160. In such examples, the weight of article 100 may be used to maintain engagement between alignment structure 202 and optical device 160 during normal operation of optical device 160. In other examples, the size and shape of main body 110 may be configured to urge optical device 160 into engagement with alignment structure 202 when optical device 160 is received into the main body. In some examples, engaging alignment apparatus 200 with optical device 160 may comprise detachably coupling optical device 160 to alignment apparatus 200. For example, alignment apparatus 200 may comprise one or more fastening mechanisms suited to be attached to a surface of optical device 160 or to be coupled to a complimentary fastening mechanism of optical device 160. One skilled in the art will appreciate that there are many different methods to detachably couple the alignment apparatus and optical device and that such methods are within the scope of this application.

Figure 3:
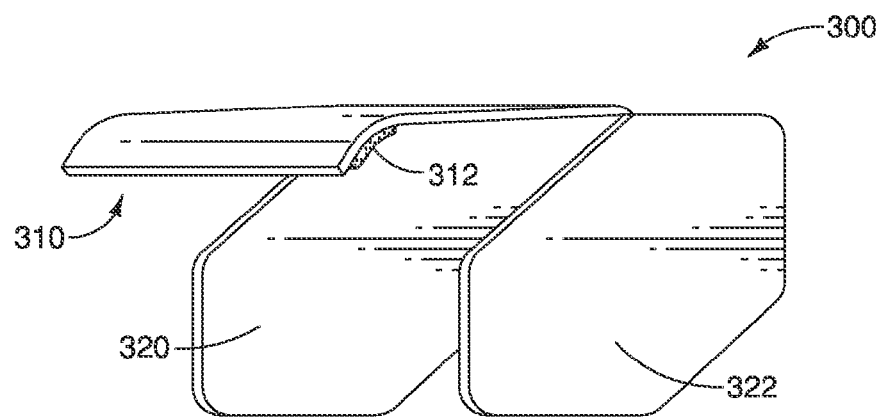
FIG. 3 is a perspective view of a detachable viewing visor that may be used together with the article of FIG. 1.

According to some examples, article 100 may include a viewing visor configured to facilitate a viewing of an interior of main body 110 through viewing aperture 140. FIG. 3 is a perspective view of a detachable viewing visor 300 that may be used together with article 100 of FIG. 1. Viewing visor 300 may be distinct from and selectively attachable to a main body. Viewing visor 300 may also be configured to be engageable with the main body to fix viewing visor 300 relative to the main body. In some examples, viewing visor 300 may be sized and/or shaped to engage with a main body via a friction fit. For example, side panels 320 and 322 may be positioned and spaced to correspond with a shape of the main body such that when engaged, friction between each respective side panels 320 and 322 and the main body constrain relative movement between viewing visor 300 and a main body. In some examples, viewing visor 300 and a main body may be made from materials that conducive to forming a friction fit. In this example, viewing visor 300 is configured to form a friction fit with main body 110 of article 100 of FIG. 1.

Figure 4:
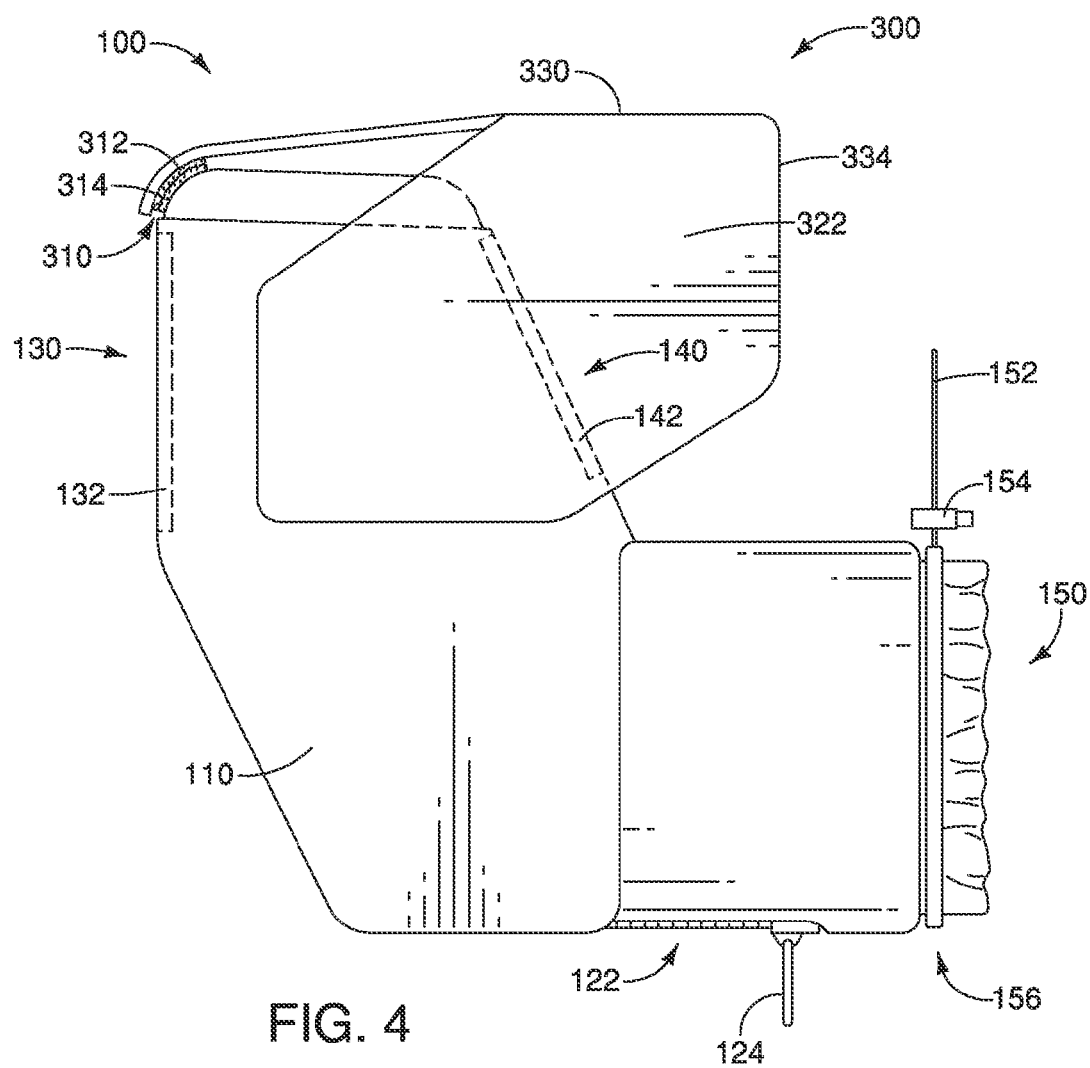
FIG. 4 is a side plan view of the viewing visor of FIG. 3 engaged to the main body of the article of FIG. 1.

In some examples, a fastening apparatus 310 may be used to engage viewing visor 300 to a main body. Fastening apparatus 310 may include one or more fastening mechanisms positioned on viewing visor 300 and/or the main body to engage viewing visor 300 with the main body. FIG. 4 is a side plan view illustrating viewing visor 300 engaged to main body 110 of article 100 of FIG. 1. In this example, fastening apparatus 310 comprises a pair of fastening mechanisms including a hook fastener 312 and a loop fastener 314. Hook fastener 312 and loop fastener 314 are respectively positioned on viewing visor 300 and main body 110 to couple with each other when viewing visor 300 is engaged with main body 110.

Figure 5:
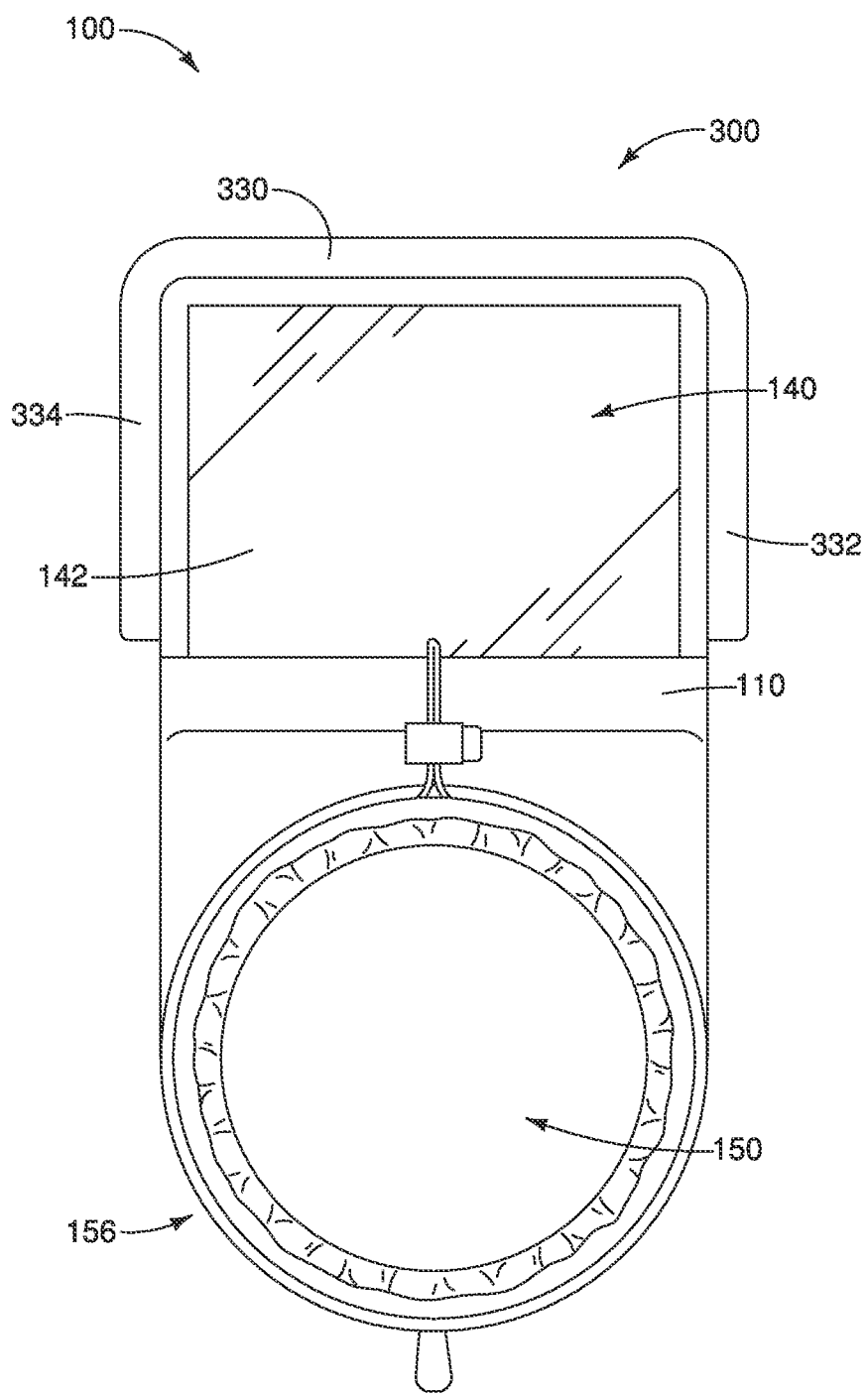
FIG. 5 is a rear plan view of the viewing visor of FIG. 3 engaged to the main body of the article of FIG. 1.

Engaging viewing visor 300 with main body 110 may provide shade adjacent to or near window 142 to facilitate viewing a display of an optical device received within main body 110. In some examples, viewing visor 300 may provide shade via one or more visor members 330-334. FIG. 5 is a rear plan view illustrating viewing visor 300 engaged to main body 110 of article 100 of FIG. 1. FIG. 5 shows viewing visor 300 comprising a top visor member 330 and peripheral visor members 332 and 334. Shade from visor members 330-334 of viewing visor 300 provides the advantage of reducing glare and/or increasing visibility of a display in bright environments. One skilled in the art will appreciate that there are many different configurations and combinations of visor members that may provide this advantage and that such configurations and combinations are within the scope of this application.

Figure 6:
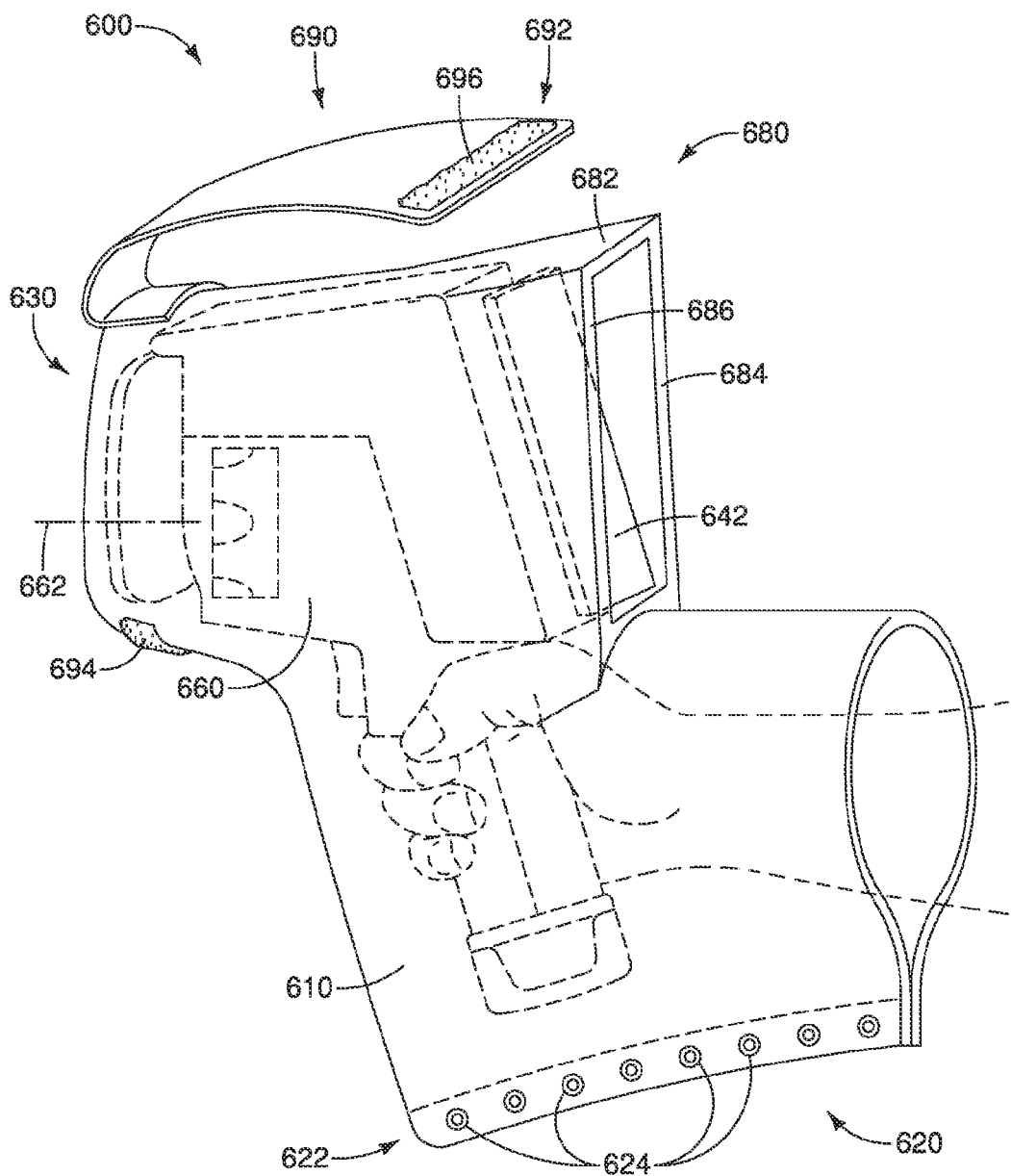
FIG. 6 is a side perspective view of an article for use with an optical device.

FIG. 6 is a side perspective view of article 600 including an optical device 660 within main body 610. Article 600 includes a viewing visor 680 integral with main body 610. Viewing visor 680 is configured to facilitate viewing an interior of main body 610 through window 642 and comprises top visor member 682 and peripheral visor members 684 and 686.

Main body 610 may also include optical aperture 630 aligned with an optical axis 662 of optical device 660. Optical aperture 630 may be supported by one or more structural members to support optical aperture 630 in an open position as to not obstruct optical axis 662. In some examples, structural members may be formed from a substantially rigid material and be coupled to or integral with main body 610 adjacent to or near a periphery of optical aperture 630. According to some examples, the one or more structural members may comprise a ring around optical aperture 630. This feature is particularly advantageous where main body 610 is constructed from a flexible or soft material causing optical aperture 630 to be more prone to deforming and obstructing optical axis 662 during normal operation of article 600.

According to some examples, main body 610 may also include an optical cover 690 configured to be selectively positionable in an open position and a closed position. The open position of optical cover 690 may substantially expose optical aperture 630 while the closed position may substantially cover optical aperture 630. Main body 610 may also include fastening apparatus 692 configured to releasably fasten optical cover 690 in the open and/or closed position. Fastening apparatus 692 may comprise one or more fastening mechanisms positioned on optical cover 690 and/or main body 610. For example, fastening apparatus 692 may include a hook fastener 696 positioned on optical cover 690 and a loop fastener 694 on main body 610 to secure optical cover 690 in a closed position.

FIG. 6 also illustrates main body opening 620 and a fastening apparatus 622 configured to close main body opening 620. In this example, fastening apparatus 622 comprises a series of snap fasteners 624 positioned on main body 610 along a periphery of main body opening 620.

Figure 7:
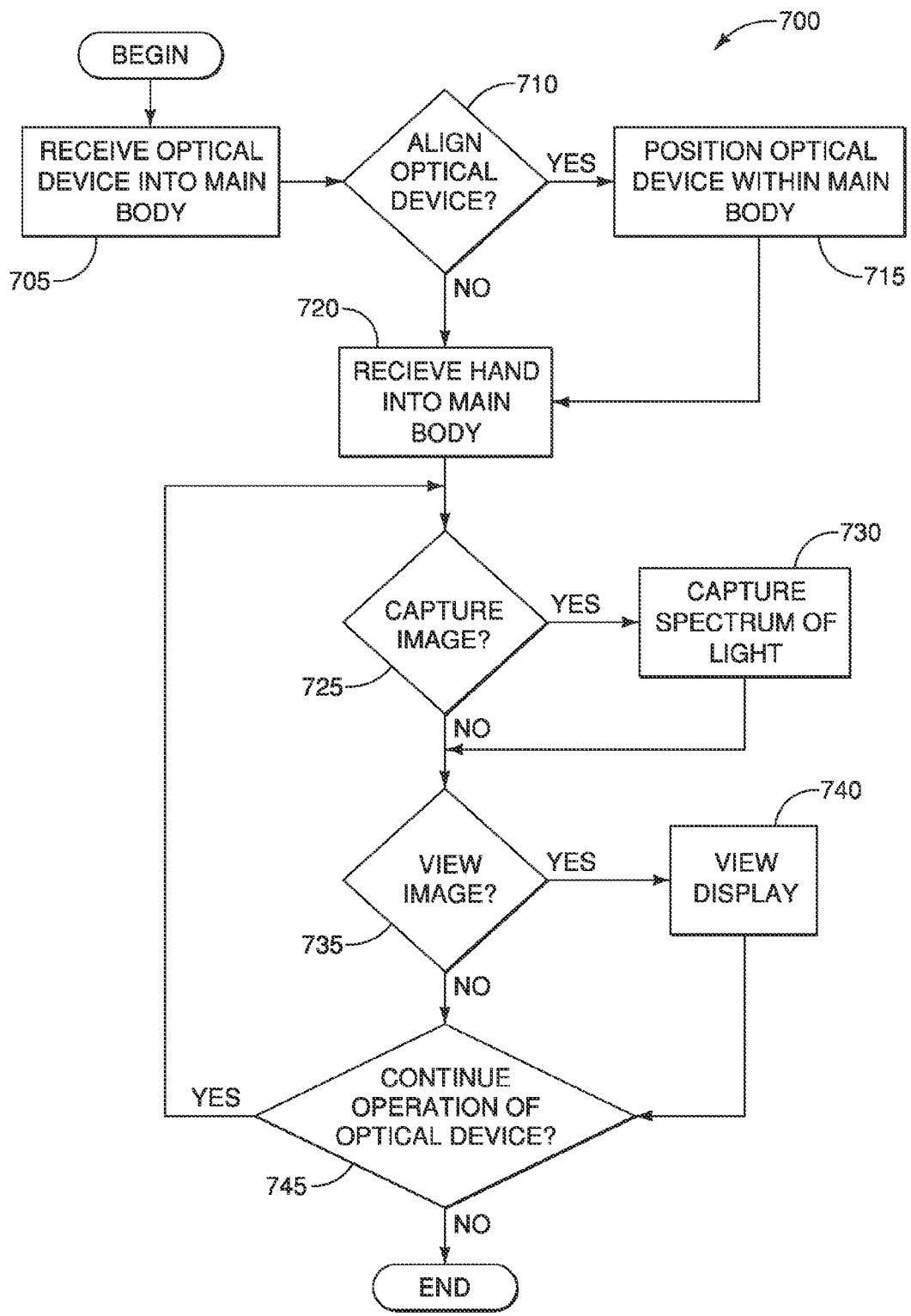
FIG. 7 is a flow chart illustrating a method for using an optical device in combination with an article.

FIG. 7 is a flow chart illustrating a method 700 in accordance with some embodiments of the present invention for using an optical device in combination with an article. Method 700 may include receiving the optical device into a main body of an article by substantially enclosing the optical device within the main body in step 705. Step 705 may be performed by inserting the optical device into the main body either through a main body opening or an access opening. In some examples, a user may decide not to align the optical device within the main body and proceed directly to step 720. In other examples, a user may decide in step 710 to align the optical device within the main body and position the optical device within the main body in step 715. The optical device may be positioned within the main body in step 715 such that an optical sensor of the optical device is aligned with an optical aperture of the main body, and a display of the optical device is aligned with a viewing aperture of the main body. In some examples, the optical device may be positioned within the main body by engaging the optical device via an alignment apparatus of the main body. According to some examples, engaging the optical device with the main body may include coupling the alignment apparatus with the optical device. The alignment apparatus may be any of the alignment apparatuses discussed herein or any other suitable alignment apparatus.

Step 720 of method 700 may include receiving a hand of a user into the main body of the article to allow the user to operate the optical device while the optical device is substantially enclosed within the main body. The user's hand may be received via an access opening of the main body. In some examples, receiving a hand of a user into the main body may also include sealing the access opening around the user's hand using a closure apparatus associated with the access opening. In some examples, step 720 may include receiving two hands of a user into the main body.

Once the user's hand is received within the interior of the main body, the user may freely operate the optical device. For example, a user may operate the optical device to capture an image in step 725 or to view an image in step 735. If a user decides to capture an image, method 700 proceeds to step 730 where the optical device may capture one or more spectrums of light with the optical device while the optical device is substantially enclosed within the main body. As noted above, the optical device may include an optic sensor that is configured to capture one or more spectrums of light from outside of the main body through an optical aperture of the main body. If a user decides to view an image in step 735, method 700 proceeds to step 740 where a user may view the display of the optical device from outside the main body while the optical device is substantially enclosed within the main body of the article. As noted above, the user may view the display through a viewing aperture of the main body. In some examples, the main body may also include a viewing visor to facilitate viewing of the display. According to some examples, if a user decides to continue to operate the optical device in step 745, the user may return to step 725 of method 700.

In other examples, method 700 may also include additional steps to control the temperature within the main body. For example, method 700 may include the step of insulating the interior of the main body from ambient surroundings of the main body. Method 700 may also include additional steps of providing heating and/or cooling elements to maintain the interior of the main body at a temperature that is optimal for performance of the optical device and/or the comfort of the user.

Various examples of the invention have been described. Although the present invention has been described in considerable detail with reference to certain disclosed embodiments, the embodiments are presented for purposes of illustration and not limitation. Other embodiments incorporating the invention are possible. One skilled in the art will appreciate that various changes, adaptations, and modifications may be made without departing from the spirit of the invention and the scope of the appended claims

What is claimed is:

1. An article for use with an optical device, the article comprising a main body configured to substantially enclose the optical device and insulate an interior of the main body from ambient surroundings of the main body, the main body comprising:
    an optical aperture configured to allow one or more spectrums of light into and out of the main body,
    a viewing aperture separate from the optical aperture and configured to allow a user to view the interior of the main body from outside the main body,
    an alignment apparatus configured to maintain an orientation of the optical device such that the optical aperture is in alignment with an optical axis of the optical device and the viewing aperture is in alignment with a display of the optical device, the alignment apparatus comprising an aperture and/or a cutaway that at least partially surrounds the optical axis of the optical device,
    a main body opening separate from the optical aperture and configured to receive the optical device, and
    an access opening configured to receive a hand of the user into the main body.

2. The article of claim 1, wherein the access opening and the main body opening are the same such that the access opening is further configured to receive the optical device.

3. The article of claim 1, wherein the main body opening is separate from the access opening.

4. The article of claim 3, wherein the main body further comprises a main body fastening apparatus configured to substantially close the main body opening.

5. The article of claim 1, further comprising a window configured to substantially cover the optical aperture, the window being substantially transparent to the one or more spectrums of light.

6. The article of claim 1, wherein the main body further comprises a viewing window configured to cover the viewing aperture.

7. The article of claim 1, further comprising a viewing visor configured to facilitate viewing the interior of the main body from outside the main body via the viewing aperture.

8. The article of claim 7, wherein the viewing visor is distinct from the main body and is selectively attachable to the main body.

9. The article of claim 1, wherein the main body further comprises a closure apparatus configured to be selectively operable to open or close the access opening.

10. The article of claim 9, wherein the closure apparatus comprises one or more elastic members and wherein the closure apparatus is configured to form a seal around the hand or a forearm of the user via the one or more elastic members when the access opening is closed.

11. The article of claim 1, further comprising a heating element located in the interior of the main body.

12. The article of claim 1, further comprising an optical cover configured to be selectively positionable in an open position and a closed position, to substantially expose the optical aperture in the open position, and to substantially cover the optical aperture in the closed position.

13. The article of claim 12, further comprising an optical cover fastening apparatus configured to releasably fasten the optical cover in either the open position or the closed position.

14. A system comprising:
    an optical device including an optical sensor and a display, the optical sensor configured to capture one or more spectrums of light along an optical axis; and
    an article comprising a main body configured to substantially enclose the optical device and insulate an interior of the main body from ambient surroundings of the main body, the main body comprising:
        an optical aperture configured to allow the one or more spectrums of light into and out of the main body, the optical aperture being aligned with the optical axis of the optical sensor,
        a viewing aperture separate from the optical aperture and configured to allow a user to view the optical device from outside of the main body, the viewing aperture being aligned with the display of the optical device,
        an alignment apparatus configured to maintain an orientation of the optical device such that the optical aperture is in alignment with the optical axis of the optical sensor and the viewing aperture is in alignment with the display, the alignment apparatus comprising an aperture and/or a cutaway that at least partially surrounds the optical axis of the optical device,
        a main body opening separate from the optical aperture and configured to receive the optical device, and
        an access opening configured to receive a hand of the user into the main body during operation of the optical device.

15. The system of claim 14, wherein the access opening and the main body opening are the same opening such that the access opening is further configured to receive the optical device.

16. The system of claim 14, further comprising a window configured to substantially cover the optical aperture, the window being substantially transparent to the one or more spectrums of light.

17. The system of claim 14, wherein the main body further comprises a viewing window configured to cover the viewing aperture.

18. The system of claim 14, further comprising a viewing visor configured to facilitate viewing the interior of the main body from outside the main body via the viewing aperture.

19. The system of claim 14, wherein the main body further comprises a closure apparatus configured to be selectively operable to open or close the access opening.

20. The system of claim 14, further comprising a heating element separate from the optical device and located in the interior of the main body.

21. The system of claim 14, further comprising an optical cover configured to be selectively positionable in an open position and a closed position, to substantially expose the optical aperture in the open position, and to substantially cover the optical aperture in the closed position.

22. The system of claim 14, wherein the alignment apparatus is coupled to the main body within an interior of the main body, and wherein the alignment apparatus is configured to engage with the optical device to maintain the orientation of the optical device.

23. The system of claim 22, wherein the alignment apparatus is configured to engage with a surface of the optical device.

24. A method for using an optical device in combination with an article, the method comprising:
   receiving the optical device into a main body of the article via a main body opening to substantially enclose the optical device within the main body;
   positioning the optical device within the main body and engaging the optical device with an alignment apparatus of the main body such that an optical sensor of the optical device is aligned with an aperture and/or cutaway in the alignment apparatus and an optical aperture of the main body, and a display of the optical device is aligned with a viewing aperture of the main body;
   receiving a hand of a user into the main body of the article to allow the user to operate the optical device while the optical device is substantially enclosed within the main body;
   capturing one or more spectrums of light with the optical device through the optical aperture in the main body while the optical device is substantially enclosed within the main body; and
   viewing the display of the optical device through the viewing aperture in the main body from outside the main body while the optical device is substantially enclosed within the main body of the article, wherein the viewing aperture is separate from the optical aperture.

25. The method of claim 24, wherein receiving the hand of the user into the main body includes inserting the hand into the main body via an access opening of the main body.

26. The method of claim 25, wherein the access opening and the main body opening are the same opening.

27. The method of claim 24, further comprising heating an interior of the main body using a heat element.

28. The method of claim 24, further comprising insulating an interior of the main body from ambient surroundings of the main body.

29. The method of claim 24, further comprising positioning an optical cover from a closed position to an open position, the optical cover being positionable to substantially expose the optical aperture of the main body while in the open position, and to substantially cover the optical aperture in the closed position.

30. The method of claim 29, wherein positioning the optical cover from the closed position to the open position comprises releasably fastening the optical cover in the open position via an optical cover fastening apparatus.

* * * * *